(12) United States Patent
Yoon

(10) Patent No.: US 9,696,800 B2
(45) Date of Patent: Jul. 4, 2017

(54) MENU SELECTION APPARATUS USING GAZE TRACKING

(71) Applicant: Hyundai Motor Company, Seoul (KR)

(72) Inventor: Il Yong Yoon, Seoul (KR)

(73) Assignee: Hyundai Motor Company, Seoul (KR)

( * ) Notice: Subject to any disclaimer, the term of this patent is extended or adjusted under 35 U.S.C. 154(b) by 65 days.

(21) Appl. No.: 14/669,837

(22) Filed: Mar. 26, 2015

(65) Prior Publication Data

US 2016/0132106 A1 May 12, 2016

(30) Foreign Application Priority Data

Nov. 6, 2014 (KR) .................. 10-2014-0153939

(51) Int. Cl.
*G06F 3/01* (2006.01)
*G06F 3/0482* (2013.01)
*G06F 3/038* (2013.01)
*B60K 35/00* (2006.01)

(52) U.S. Cl.
CPC .............. *G06F 3/013* (2013.01); *B60K 35/00* (2013.01); *G06F 3/038* (2013.01); *G06F 3/0482* (2013.01)

(58) Field of Classification Search
CPC ......... B60K 35/00; G06F 3/013; G06F 3/038; G06F 3/0482
USPC .......................................... 715/765; 345/156
See application file for complete search history.

(56) References Cited

U.S. PATENT DOCUMENTS

| 2012/0257035 | A1 | 10/2012 | Larsen | |
|---|---|---|---|---|
| 2013/0235347 | A1* | 9/2013 | Hennessey | G06F 3/013 351/210 |
| 2014/0250395 | A1* | 9/2014 | Tanaka | G06F 3/013 715/765 |
| 2015/0010207 | A1* | 1/2015 | Inada | B60K 35/00 382/103 |
| 2015/0022664 | A1* | 1/2015 | Pflug | H04N 7/181 348/148 |
| 2015/0312404 | A1* | 10/2015 | Abramson | H04W 4/027 455/418 |
| 2016/0132106 | A1* | 5/2016 | Yoon | G06F 3/013 345/158 |

FOREIGN PATENT DOCUMENTS

| JP | 2000-089905 A | 3/2000 |
|---|---|---|
| JP | 2012-221498 A | 11/2012 |
| JP | 2013-143012 | 7/2013 |
| KR | 10-2007-0022965 A | 2/2007 |

(Continued)

*Primary Examiner* — Tony Davis
(74) *Attorney, Agent, or Firm* — Mintz Levin Cohn Ferris Glovsky and Popeo, P.C.; Peter F. Corless

(57) ABSTRACT

A menu selection apparatus using gaze tracking includes: a gaze tracker configured to track a gaze of a driver and to output time series gaze data; a timer included in the gaze tracker and configured to output a timing pulse; a buffer configured to store the time series gaze data; a counter configured to count the timing pulse to adjust synchronization with the timer; a button configured to output a click signal when being clicked by the driver; and a controller configured to extract the time series gaze data for a critical time based on button click timing as the click signal is output from the button and to then calculate an average of gaze vectors within each time series gaze data.

8 Claims, 5 Drawing Sheets

(56) References Cited

FOREIGN PATENT DOCUMENTS

| KR | 10-2009-0061435 A | 6/2009 |
|---|---|---|
| KR | 20120062541 | 6/2012 |
| KR | 101255219 | 4/2013 |
| KR | 101348903 | 1/2014 |

\* cited by examiner

MENU SELECTION APPARATUS USING GAZE TRACKING

CROSS-REFERENCE TO RELATED APPLICATION

This application claims the benefit of and priority to Korean Patent Application No. 10-2014-0153939, filed on Nov. 6, 2014 in the Korean Intellectual Property Office, the disclosure of which is incorporated herein in its entirety by reference.

TECHNICAL FIELD

The present disclosure relates to a menu selection apparatus using gaze tracking, and more particularly, to a technology of using driver's gaze as pointing for a menu and recognizing a button click of the driver as a selection for the pointed menu.

BACKGROUND

Generally, gaze tracking technology can be used to understand the position at which a user gazes and has been widely used for marketing, medical service, driving, menu control, and the like. Gaze tracking schemes using gaze tracking technology may be largely classified into two schemes: a remoted scheme and a head mounted scheme.

The remoted scheme involves searching for a user's gazing point within any defined monitor or screen. The remoted scheme does not inconvenience a user to carry the equipment, but has a limited use space, and therefore, may not be used in real environment. Further, there is a need to correct the gazing point depending on a user's motion.

The head mounted scheme tracks the user's gaze to search for the gazing point by using equipment on a user's head and mapping the searched gazing point to a front image. The head mounted scheme may be used in a three-dimensional space under real environment.

When the user's gaze stays at a specific point for a predetermined time or more, the existing menu selection method using gaze tracking recognizes the user's gaze staying at a specific point as an instruction of the user to select a menu at which the user's gaze stays. The existing menu selection method using gaze tracking may not be applied under the situation that the user does not gaze at the menu for a predetermined time or more because the driver's gaze needs to stay at the specific menu for a predetermined time or more (for example, 2 seconds or more) to select a menu item. In particular, when the existing menu selection method using gaze tracking is applied to a driving vehicle, a driver gazes forward but gazes at the specific menu on a display for a predetermined time or more to select a menu item. Therefore, safe driving may be hindered due to the driver's gaze being fixated on the menu while driving.

SUMMARY

The present disclosure has been made to solve the above-mentioned problems occurring in the related art while advantages achieved by the related art are maintained intact.

An aspect of the present disclosure provides a menu selection apparatus for gaze tracking capable of accurately identifying a menu item to be selected by a driver by detecting a menu item at which the driver gazes in consideration of a human response time (for example, 0.1 seconds), by using the driver's gaze as pointing for the menu and recognizing a button click of the driver as a selection for the pointed menu.

According to embodiments of the present disclosure, a menu selection apparatus using gaze tracking includes: a gaze tracker configured to track a gaze of a driver and to output time series gaze data; a timer included in the gaze tracker and configured to output a timing pulse; a buffer configured to store the time series gaze data; a counter configured to count the timing pulse to adjust synchronization with the timer; a button configured to output a click signal when being clicked by the driver; and a controller configured to extract the time series gaze data for a critical time based on button click timing as the click signal is output from the button and to then calculate an average of gaze vectors within each time series gaze data.

The time series gaze data may include a gaze vector field and a time stamp field.

The button may be mounted at a steering wheel of a vehicle.

Furthermore, according to embodiments of the present disclosure, a menu selection apparatus using gaze tracking includes: a gaze tracker configured to track a gaze of a driver and to output time series gaze data; a buffer configured to store the time series gaze data; a timer configured to adjust synchronization with the gaze tracker based on a time stamp of the time series gaze data; a button configured to output a click signal when being clicked by the driver; and a controller configured to extract the time series gaze data for a critical time based on button click timing as the click signal is output from the button and to then calculate an average of gaze vectors within each time series gaze data.

The time series gaze data may include dummy data.

The dummy data may include a time stamp field.

The time series gaze data may include a flag field for data identification, a gaze vector field, and a time stamp field.

The button may be mounted at a steering wheel of a vehicle.

The foregoing and other objects, features, aspects and advantages of the present disclosure will be understood and become more apparent from the following detailed description of the present disclosure. Also, it can be easily understood that the objects and advantages of the present disclosure can be realized by the units and combinations thereof recited in the claims.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
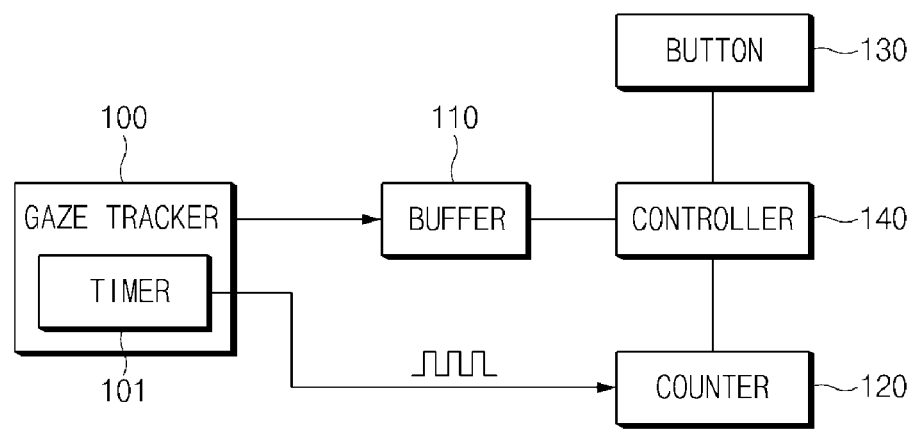
FIG. 1 is a configuration diagram of a menu selection apparatus using gaze tracking according to embodiments of the present disclosure.

The foregoing objects, features and advantages will become more apparent from the following detailed description of embodiments of the present disclosure with reference to accompanying drawings, which are set forth hereinafter. Accordingly, those having ordinary knowledge in the related art to which the present disclosure pertains will easily embody technical ideas or spirit of the present disclosure. Further, when the detailed description of technologies known in the related art are considered to make the gist of the present disclosure obscure in the present disclosure, the detailed description thereof will be omitted. Hereinafter, embodiments of the present disclosure will be described in detail with reference to the accompanying drawings.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with other components.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

FIG. 1 is a configuration diagram of a menu selection apparatus using gaze tracking according to embodiments of the present disclosure, in which the menu selection apparatus using gaze tracking may be applied to an audio video navigation (AVN) system, and the like. As illustrated in FIG. 1, the menu selection apparatus using gaze tracking according to embodiments of the present disclosure includes a gaze tracker 100, a buffer 110, a counter 120, a button 130, and a micro control unit (MCU) 140.

Figure 2:
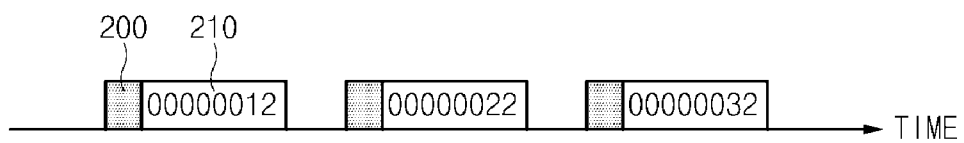
FIG. 2 is an exemplified diagram of time series gaze data according to embodiments of the present disclosure.

Describing each component, first, the gaze tracker 100 tracks driver's gaze to output time series gaze data. As illustrated in FIG. 2, the time series gaze data are generated in a predetermined time unit and each gaze data includes a field 200 in which gaze vectors are written and a time stamp field 210 in which the generation time of the gaze data is written. Further, the gaze tracker 100 includes a timer 101 for providing the generation time of the gaze data which is written in the time stamp field 210.

For example, the gaze tracker 100 may include a first imager (not illustrated) configured to acquire an image by photographing a target at which a driver gazes, a second imager (not illustrated) configured to acquire binocular images for driver's both eyes which gaze at the target, and an image processor (not illustrated) configured to detect pupil regions of both eyes using the binocular images provided from the second imager and map the detected pupil region to the target image provided from the first imager to extract a region of interest of the target at which a user gazes.

Next, the buffer 110 stores the time series gaze data which are output from the gaze tracker 100. The buffer 110 may be operated by a first in first out scheme. Next, the counter 120 counts a timing pulse transferred from the timer 101 to adjust synchronization with the timer 101. Next, the button 130 may be mounted at a steering wheel of a vehicle and is pressed (clicked) by a driver to output a click signal. Next, the controller 140 controls each component to normally perform their own functions.

In particular, the controller 140 extracts the gaze data which are generated for a critical time based on button click timing as the click signal is output from the button 130 and then calculates an average of the gaze vectors within each gaze data. Then, the controller 140 applies the critical time based on the button click timing to consider a human reaction time. The so calculated average of the gaze vectors points out a menu to be selected by the driver through the button.

Here, the menu at which the driver gazes may also be selected by a weighted average, median filtering, or the like, in addition to the average. For reference, the weighted average means an average value obtained by multiplying weights corresponding to importance or influence at the time of obtaining an average of a plurality of variances.

The median filtering is a non-linear region processing technique and is a scheme of aligning pixels in a window in an ascending order, while sliding a window having any size for the pixels of one image, selecting a middle value thereof, and filling an output image with the selected middle value. A basic function of the median filtering is to remove a pixel value protruding by making pixels having very clear brightness similar to neighboring pixels.

Figure 5:
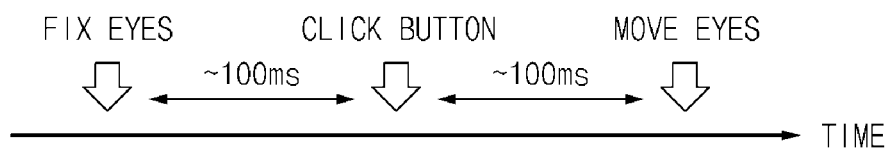
FIG. 5 is an explanation diagram for a critical time based on button click timing according to embodiments of the present disclosure.

Hereinafter, the critical time based on a current time will be described in detail with reference to FIG. 5. In FIG. 5, a position (e.g., a menu position) at which the driver's gaze stays is estimated by the controller 140, targeting the gaze data generated before 100 ms and after 100 ms based on the button click timing. By doing so, the human reaction time may be considered. This uses a principle that when a driver's gaze wants to stay at any one point, his/her gaze moves in the desired direction from a previous main viewpoint, he/she stays at the desired point and then may press the button even after 100 ms, and he/she may not stay at other points within 100 ms even after he/she presses the button.

Here, the critical time is set to be 200 ms based on the button click timing but may be adjusted in consideration of an age, a reaction time, disability rating, and the like of a driver. For example, in the case of an old person or a woman driver with a slow reaction time, the critical time may be set to be, for example 300 ms.

Figure 3:
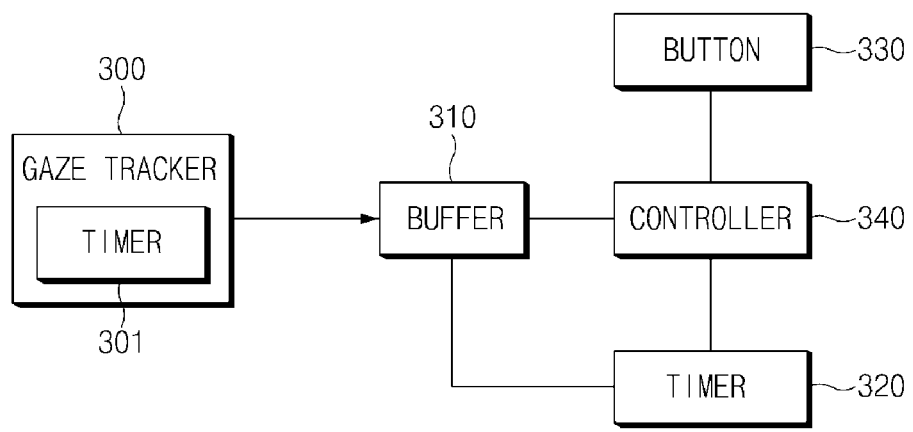
FIG. 3 is a configuration diagram of a menu selection apparatus using gaze tracking according to embodiments of the present disclosure.

FIG. 3 is a configuration diagram of a menu selection apparatus using gaze tracking according to embodiments of the present disclosure. As illustrated in FIG. 3, the menu selection apparatus using gaze tracking according to embodiments of the present disclosure includes a gaze tracker 300, a buffer 310, a timer 320, a button 330, and a micro control unit (MCU) 340. In this configuration, functions of the buffer 310 and the button 330 are the same as the functions of the buffer 110 and the button 130 according to embodiments of the present disclosure and therefore the description thereof will be omitted.

Figure 4:
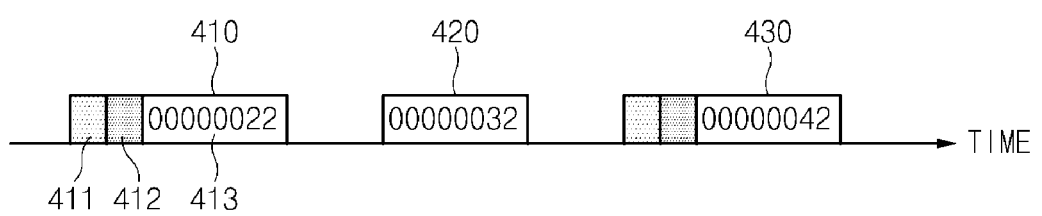
FIG. 4 is an exemplified diagram of time series gaze data according to embodiments of the present disclosure.

First, the gaze tracker 300 generates time series gaze data as illustrated in FIG. 4. In this case, each gaze data includes a flag field 411 for data identification, a field 412 in which gaze vectors are written, and a time stamp field 413. Further, the gaze tracker 300 includes a timer 301 for providing the generation time of the gaze data which is written in the time stamp field 413. Further, the gaze tracker 300 generally generates the gaze data at a predetermined period of time but when the gaze tracker 300 does not generate the gaze data, generates dummy data 420. In this case, the dummy data 420 include only the time stamp field. A usage of the dummy data is to make the timer 320 adjust synchronization with the gaze tracker 300. Consequently, the gaze tracker 300 generates the time series gaze data and the so generated time series gaze data may include only the gaze data and may include the gaze data and the dummy data together.

Next, the timer 320 adjusts synchronization based on the time stamp of the time series gaze data which are output from the gaze tracker 300. In this case, the time series gaze data include the dummy data and thus the timer 320 may synchronize with the timer 301. Next, the controller 340 extracts the gaze data which are generated for a critical time based on button click timing as the click signal is output from the button 330 and then calculates an average of the gaze vectors within each gaze data. Then, the controller 340 applies the critical time based on the button click timing to consider the human reaction time. The so calculated average of the gaze vectors points out a menu to be selected by the driver through the button. Here, the menu at which the driver gazes may also be selected by the weighted average, the median filtering, or the like, in addition to the average.

The embodiments of the present disclosure describe the button as an example but the controller 340 using gaze tracking may further include an input device which receives a driver's voice or gesture, etc. As described above, according to embodiments of the present disclosure, it is possible to accurately select the menu to be selected by a driver by detecting the menu at which the driver gazes in consideration of the human response time (for example, 0.1 seconds), in using the driver's gaze as the pointing for the menu and recognizing the button click of the driver as the selection for the pointed menu.

The present disclosure described above may be variously substituted, altered, and modified by those skilled in the art to which the present disclosure pertains without departing from the scope and sprit of the present disclosure. Therefore, the present disclosure is not limited to the above-mentioned embodiments and the accompanying drawings.

What is claimed is:

1. A menu selection apparatus using gaze tracking, comprising:
   a gaze tracker configured to track a gaze of a driver and to output time series gaze data;
   a timer included in the gaze tracker and configured to output a timing pulse;
   a buffer configured to store the time series gaze data;
   a counter configured to count the timing pulse to adjust synchronization with the timer;
   a button configured to output a click signal when being clicked by the driver; and
   a controller configured to extract the time series gaze data for a critical time based on button click timing as the click signal is output from the button and to then calculate an average of gaze vectors within each time series gaze data.

2. The menu selection apparatus according to claim 1, wherein the time series gaze data includes a gaze vector field and a time stamp field.

3. The menu selection apparatus according to claim 1, wherein the button is mounted at a steering wheel of a vehicle.

4. A menu selection apparatus using gaze tracking, comprising:
   a gaze tracker configured to track a gaze of a driver and to output time series gaze data;
   a buffer configured to store the time series gaze data;
   a timer configured to adjust synchronization with the gaze tracker based on a time stamp of the time series gaze data;
   a button configured to output a click signal when being clicked by the driver; and
   a controller configured to extract the time series gaze data for a critical time based on button click timing as the click signal is output from the button and to then calculate an average of gaze vectors within each time series gaze data.

5. The menu selection apparatus according to claim 4, wherein the time series gaze data includes dummy data.

6. The menu selection apparatus according to claim 5, wherein the dummy data includes a time stamp field.

7. The menu selection apparatus according to claim 4, wherein the time series gaze data includes a flag field for data identification, a gaze vector field, and a time stamp field.

8. The menu selection apparatus according to claim 4, wherein the button is mounted at a steering wheel of a vehicle.

* * * * *